US007197518B2

(12) United States Patent
Fisher et al.

(10) Patent No.: US 7,197,518 B2
(45) Date of Patent: Mar. 27, 2007

(54) METHOD AND APPARATUS FOR RECOVERY OF THE ASSOCIATION OF CONSTRUCT DEFINITIONS WITH LOGICAL VOLUMES IN A VIRTUAL TAPE SERVER

(75) Inventors: James Arthur Fisher, Tucson, AZ (US); Kevin Lee Gibble, Tucson, AZ (US); Gregory Tad Kishi, Oro Valley, AZ (US); Jonathan Wayne Peake, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 571 days.

(21) Appl. No.: 10/230,933

(22) Filed: Aug. 29, 2002

(65) Prior Publication Data

US 2004/0044701 A1 Mar. 4, 2004

(51) Int. Cl.
*G06F 12/00* (2006.01)
(52) U.S. Cl. ....................... 707/202; 711/111
(58) Field of Classification Search ............... 707/200, 707/202, 204, 203; 711/111, 112, 113; 714/25
See application file for complete search history.

(56) References Cited

U.S. PATENT DOCUMENTS

| 5,164,909 A * | 11/1992 | Leonhardt et al. ......... 700/215 |
| 5,809,511 A | 9/1998 | Peake ......................... 707/204 |
| 6,029,179 A | 2/2000 | Kishi ......................... 707/202 |
| 6,269,423 B1 * | 7/2001 | Kishi ......................... 711/113 |
| 6,282,609 B1 | 8/2001 | Carlson ...................... 711/112 |
| 6,304,880 B1 | 10/2001 | Kishi ......................... 707/200 |
| 6,336,163 B1 * | 1/2002 | Brewer et al. .............. 711/112 |
| 6,339,778 B1 | 1/2002 | Kishi ......................... 707/200 |
| 6,345,313 B1 * | 2/2002 | Lindholm .................... 719/315 |
| 6,360,232 B1 * | 3/2002 | Brewer et al. .............. 707/204 |
| 6,665,785 B1 * | 12/2003 | Hamilton et al. ........... 711/170 |
| 6,732,294 B2 * | 5/2004 | Mackrory et al. ............ 714/25 |
| 6,745,212 B2 * | 6/2004 | Kishi et al. ................. 707/204 |
| 6,779,077 B1 * | 8/2004 | Bakke et al. ............... 711/111 |
| 6,785,695 B1 * | 8/2004 | Hamilton et al. ........... 707/204 |
| 6,983,351 B2 * | 1/2006 | Gibble et al. ............... 711/159 |
| 2003/0004980 A1 * | 1/2003 | Kishi et al. ................. 707/204 |
| 2003/0196036 A1 * | 10/2003 | Gibble et al. ............... 711/111 |

\* cited by examiner

*Primary Examiner*—Don Wong
*Assistant Examiner*—Sheree Brown
(74) *Attorney, Agent, or Firm*—Kunzler & Associates (57) ABSTRACT

A method and apparatus to recover a construct definition associated with a logical volume in a virtual tape server (VTS) system following a disaster situation involving a library manager database. The method and apparatus re-establish the association between a logical volume or data file or block and a construct definition or volume attribute that assigns certain actions that may be taken on the logical volumes. Such actions and constructs may be defined by a client processor or by the VTS system in order to provide quality storage media management. The constructs may be uploaded to or reconstructed within the library manager database in combination with the host or virtual tape server and consequently made available to the system. In particular, the method and apparatus are configured to recover one or more of a storage group construct, a management class construct, a storage class construct, and a data class construct associated with a logical volume within a VTS system.

15 Claims, 10 Drawing Sheets

Prior Art

| VIRTUAL TAPE SERVER DATABASE 214 | |
|---|---|
| LOG001 | Single copy made... |
| LOG002 | Two copies made... |
| LOG003 | Two copies made... |
| LOG004 | Single copy made... |
| ... | ... |
| LOGNNN | Single copy made... |

| LIBRARY MANGER DATABASE 118 | |
|---|---|
| LOG001 | SG01, MC01, SC01, DC01 VCF |
| LOG002 | SG01, MC02, SC01, DC01 VCF |
| LOG003 | SG01, MC02, SC01, DC01 VCF |
| LOG004 | SG01, MC01, SC01, DC01 VCF |
| ... | ... |
| LOGNNN | SG01, MC01, SC01, DC01 VCF |

METHOD AND APPARATUS FOR RECOVERY OF THE ASSOCIATION OF CONSTRUCT DEFINITIONS WITH LOGICAL VOLUMES IN A VIRTUAL TAPE SERVER

BACKGROUND OF THE INVENTION

1. The Field of the Invention

The invention relates to virtual tape server (VTS) systems and more particularly to the recovery of the association of construct definitions and logical volumes between the virtual tape server and the library manager.

2. The Relevant Art

High density, removable media storage libraries are used to provide large quantities of storage in networked computer systems. Typically, such data storage systems are employed for backup or other secondary storage purposes, but the data storage system may also be used as primary storage in circumstances that are conducive to sequential data access and the like.

The data is stored on media cartridges, such as magnetic tapes or optical disks, that are arranged in storage bins and accessed when data on a cartridge is requested. Currently available media cartridges are capable of storing much more data than the data volume units that correspond to the size of early types of media cartridges. For example, a data volume that corresponds to a 400 megabyte disk may now be stored on a tape with up to 60 gigabytes of storage capacity.

Volume mapping is used to create a correlation between the physical capacity of a storage cartridge (stacked volume or physical volume) and the data storage unit size (virtual volumes or logical volumes) of a file or block that is stored on the cartridge. Given the available data storage capacity of a single storage media, such mapping allows multiple logical volumes to be stored on a single physical volume, hence providing an efficient use of the available storage media. A virtual tape server (VTS) is one device capable of creating and maintaining such mapping among physical volumes and logical volumes.

A typical VTS system includes a virtual tape server and an automated media library. The library is controlled by a library manager that is similar to a workstation computer. Within the VTS system, typically two databases reside on separate memory disks within the system. One database resides on the virtual tape server and the other resides within the library manager.

The VTS database contains the logical-to-physical volume mapping, as well as information concerning volume attributes that define actions that were taken on a logical volume the last time it was copied to the storage media. One of the attributes included in such information is whether a secondary copy of a logical volume was made when it was last written.

The library manager database also contains attributes associated with the logical volumes stored on the media cartridges including construct names and associated attributes. The library manager database also includes a construct flag field that associates a set of construct flags with a logical volume in the library. The library manager also controls the physical loading of media cartridges in corresponding drives by storing the physical location of the physical volumes within the storage bins and controlling a robotic accessor arm that retrieves the physical volumes from the bins and loads the cartridges in the drives when a mount request is received.

Through proper management of the volume mapping, construct attributes and construct flags, a host processor and peripheral data storage equipment may access logical volumes as though they were individual physical volumes. The volume access management is provided via the virtual tape server and library manager as described above.

It is possible for the library manager database to be lost. This may happen, for instance, as the result of a hardware error or physical damage. In such an occurrence, the VTS system must be able to recover the association of the construct attributes with the corresponding logical volumes in order to resume operation of the storage management system, including accessing and appropriately processing the stored data.

Current state of the art requires that, in the case of lost data from the library manager database, the library manAger database, including any construct associations, must be fully reconstructed through physical scanning of the media cartridge labels as well as the reinsertion of logical volumes and reestablishing their associated constructs. The entire media library is made unavailable to the client during the reconstruction period. The unavailability of the media library is typically prolonged due to the quantity of volumes that must be rebuilt. Consequently, a method and apparatus are needed that are capable of recovering the association of construct definitions with logical volumes, while minimizing the length of time that the system is unavailable to the host.

BRIEF SUMMARY OF THE INVENTION

The present invention has been developed in response to the present state of the art, and in particular, in response to the problems and needs in the art that have not yet been fully solved by currently available virtual tape server and library manager systems. Accordingly, it is an overall object of the present invention to provide construct definition association with a logical volume recovery apparatus and method that overcome many or all of the above-discussed shortcomings in the art.

To achieve the foregoing object, and in accordance with the invention as embodied and broadly described herein in the preferred embodiments, a method and apparatus for recovery of the association between the construct definition and logical volume in a virtual tape server (VTS) system are provided.

The construct definition association recovery apparatus is provided with a logic unit containing a plurality of modules configured to carry out the individual steps of the detection and identification process. These modules, in the described embodiments, include a recovery module, storage group module, management class module, and a storage class module.

The recovery module is configured to implement a recovery action to reestablish an association between a logical volume and a construct definition. To do this, the recovery module may invoke the storage group module, management class module, and the storage class module. The recovery module also uses a volume construct flag that is configured to indicate the selection of a default construct at insert time.

At the time a volume is written to, a host processor or virtual tape server may assign values to various fields within the volume construct flag. These fields correspond to the storage group, management class, and storage class constructs associated with the volume. The field values indicate whether or not a default construct attribute was assigned at insert time.

The storage group module is configured to recover an association between a logical volume and a storage group construct. The association is preferably recovered during an insert process by a host processor.

The management class module is configured to recover an association between a logical volume and a management class construct. The association is preferably recovered by determining if a secondary copy of the logical volume should be made.

The storage class module is configured to recover an association between a logical volume and a storage class construct. The association is preferably recovered by determining if a logical volume should remain in cache for future accesses.

A method of the present invention is also presented for recovering the construct association of a logical volume and a construct definition within a VTS system. The method may be sub-divided into partial methods that in combination perform the steps of the method as a whole.

In general, the method includes steps to set and clear the fields of the volume construct flag. As discussed previously, these fields may include a storage group default selected at insert flag, a management class default selected at insert flag, and a storage class default selected at insert flag. A data class default selected at insert flag may also be present. The state of these flag fields and corresponding values may provide guidance as to the actions that will be taken with regard to a particular logical volume.

One embodiment of the method also includes steps for the recovery of a storage group construct definition association. At the time a logical volume is inserted into the library manager database, the library manager notifies the host of the completed insert process and uploads a list of the volumes inserted to the host. The host may then process this list of volumes to determine which volumes are assigned to certain storage groups. In this embodiment, the host is required to have knowledge of such storage groups and be capable of sending a command to the library manager to set the storage group constructs of the inserted logical volumes.

Another embodiment of the method also includes steps for the recovery of a management class construct definition association. Such recovery occurs at the time that a logical volume is written to and closed. The virtual tape server requests the volume construct definitions from the library manager pertaining to the requirement to produce a secondary copy of the logical volume. The virtual tape server also requests the volume construct flag to determine if the default management class was selected at insert time. In this embodiment, the virtual tape server uses the management class and associated construct flag along with its knowledge of the volume's past history to determine if a secondary copy of the volume should be made.

A further embodiment of the method includes steps for the recovery of a storage class construct definition association. The recovery of the storage class construct definition association is a process that may occur over a period of time. Each time the host requests a mount of a logical volume and closes said volume, the host sends a command to the library manager including the storage class construct definition for the logical volume. The library manager stores the association of the storage class construct and the logical volume in its database. After the host closes the volume, the virtual tape server requests the storage class construct and associated attribute from the library manager.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
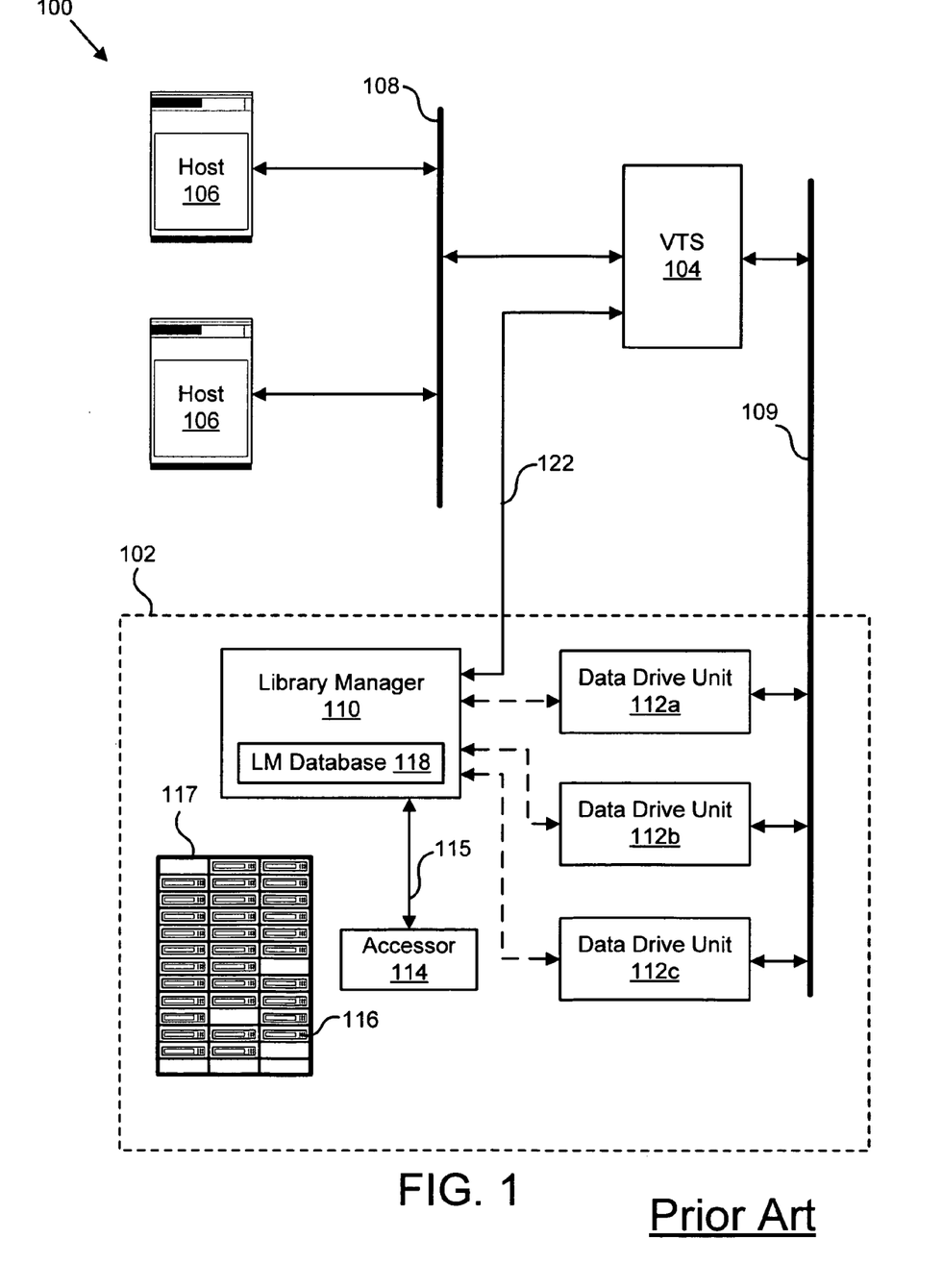
FIG. 1 is a schematic block diagram illustrating one embodiment of a representative VTS system in accordance with the prior art.

FIG. 1 illustrates a schematic block diagram of one embodiment of a representative virtual tape server (VTS) system 100 in accordance with the present invention. The VTS system 100 includes an automated library unit 102, at least one virtual tape server 104, and at least one host 106. The host 106 and the virtual tape server 104 are connected via a communications channel that in one embodiment comprises a network connection such as ESCON or FICON 108. The virtual tape server 104 and the automated library unit 102 are also connected via a communication channel 109 such as a Local Area Network (LAN).

The automated tape library unit 102 includes a library manager 110, one or more data drive devices 112, an accessor 114, and a plurality of media cartridges 116. The library manager 110, which includes at least one computing processor (not shown) is interconnected with and controls the actions of the drives 112 and the accessor 114. The library manager 110 typically also includes one or more hard disk drives (not shown) for memory storage, as well as a control panel or keyboard (not shown) to provide user input. A library manager database 118 is typically stored on the hard disk drive within the library manager 110.

The accessor 114 transports cartridges 116 between a storage bin 117 and a drive 112. The accessor 114 preferably includes a cartridge gripper and a bar code scanner (not shown), or a similar read system, mounted on the gripper. The bar code scanner reads a volume serial number (VOLSER) printed on a cartridge label affixed to the cartridge 116. The drives 112 may be magnetic tape drives, in one embodiment, or optical disk drives, in an alternative embodiment. Similarly, the cartridges 116 may contain magnetic media, optical media, or any other removable media corresponding to the type of drive 112 employed.

Figure 2:
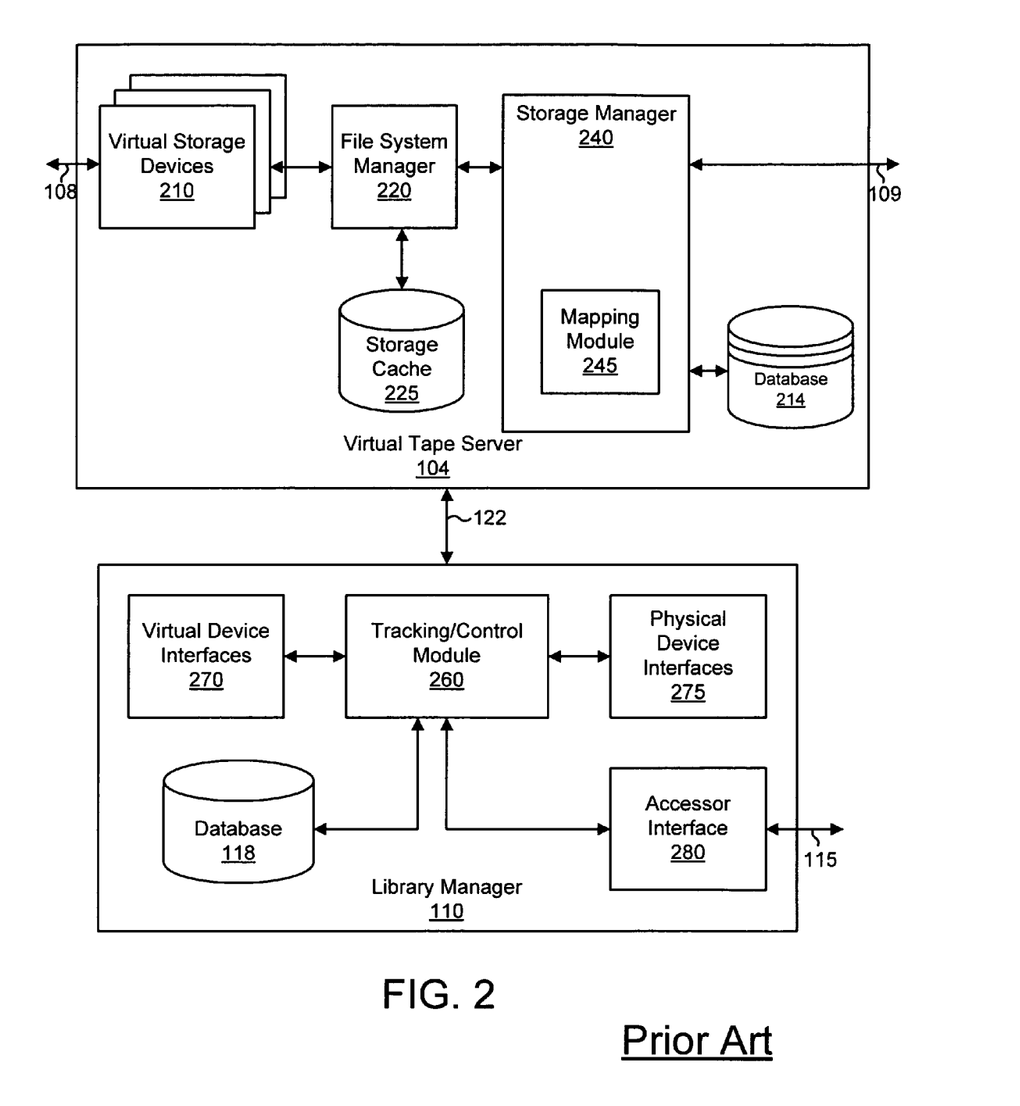
FIG. 2 is a schematic block diagram illustrating one embodiment of a representative virtual tape server system in accordance with the prior art.

FIG. 2 is a block diagram illustrating several modules of a VTS 104 and a library manager 110 of the present invention. The VTS 104 includes one or more virtual storage devices 210, a file system manager 220, a storage cache 225, and a storage manager 240 with a mapping module 245. The virtual storage devices 210 provide an interface to one or more hosts that are software compatible with legacy storage devices or subsystems. In one embodiment, the virtual storage devices 210 appear as two to sixteen 3490E control units, each with 16 tape drives. In the depicted embodiment, the VTS 104 communicates with one or more hosts via a network 108.

Internally, in one embodiment, a logical volume is stored as a file within a file system. The logical volume files may reside on the storage cache 225 under control of the file system manager 220. Logical volumes may also reside on actual physical volumes under control of the storage manager 240. The mapping module 245, which in the depicted embodiment is part of the storage manager 240, maintains the relationship between logical volumes and stacked physical volumes such as the media cartridges 116 shown in FIG. 1. In the depicted embodiment, the storage manager 240 communicates with the storage units 112 via the storage channel 109.

The library manager 250 includes a tracking/control module 260, one or more virtual device interfaces 270, one or more physical device interfaces 275, and an accesser interface 280.

The tracking/control module 260 within the library manager 250 controls insertion and removal of the physical volumes within removable media storage units such as the storage units 112 shown in FIG. 1. To maintain a proper mapping of logical volumes and their current physical placement, movement of the physical volumes to and from the storage units 112 is coordinated by the tracking/control module 260 and the storage manager 240.

The virtual device interfaces 270 and the physical device interfaces 275 provide interface and communication functions for the tracking/control module 260 to communicate with and control the virtual storage devices 210 and the storage units 112. For example, mounting and dismounting operations may be initiated by the tracking/control module 260 via the virtual device interfaces 270 and the physical device interfaces 275 for logical volumes and physical volumes respectively.

In the depicted embodiment, communication between the modules of the VTS 104 and the library manager 110 occur via the library link 122. Likewise, communications between an accesser such as the accesser 114 depicted in FIG. 1, and the library manager 110, occur via the accesser link 115. Within the library manager 110, communication and control of the accesser occurs via the accesser interface 280.

The VTS database 214 keeps track of logical volumes and their attribute history. The library manager database 118 keeps track of logical volumes and their associated attributes.

Figure 3:
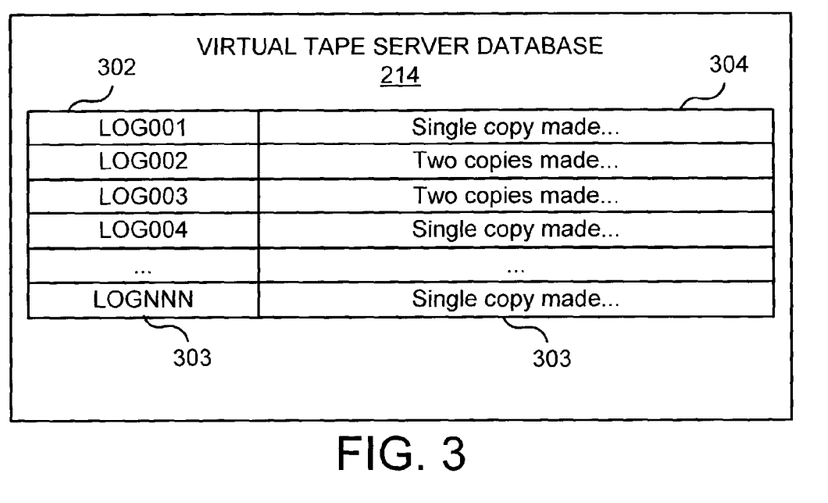
FIG. 3 is a schematic block diagram illustrating one embodiment of a representative virtual tape server database format in accordance with the present invention.

FIG. 3 illustrates one embodiment of a representative format of a VTS database 214. The format preferably includes a VOLSER field 302 that stores the VOLSER 303 of a logical volume. In one embodiment, the format also includes a write action field 304 that stores a write action 305 taken the last time the logical volume was accessed.

In the embodiment shown, a logical volume corresponding to the VOLSER 303 "LOG001" was transferred to a single location (no duplicate copy was made) the last time the logical volume was written to a physical volume 116. In contrast, the write action 305 stored in the write action field 304 corresponding to the VOLSER "LOG003" indicates that a duplicate copy of the corresponding logical volume was made the last time the logical volume was closed.

Figure 4:
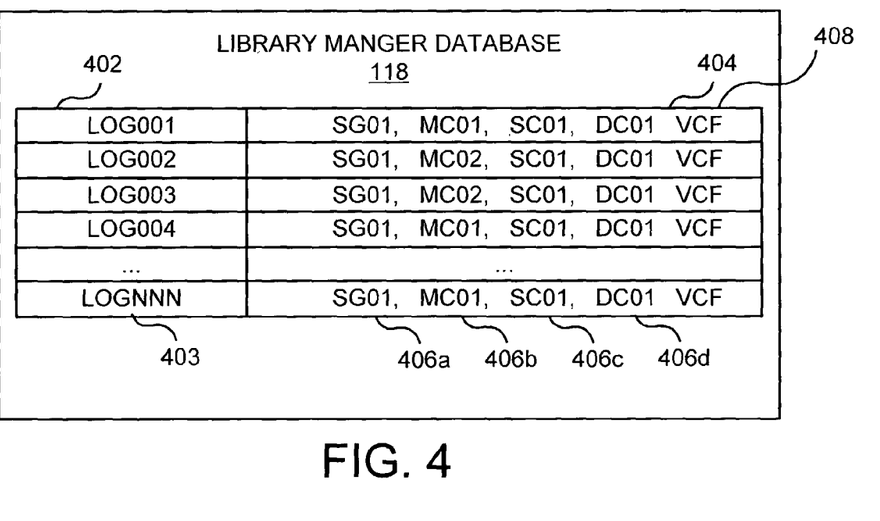
FIG. 4 is a schematic block diagram illustrating one embodiment of a representative library manager database in accordance with the present invention.

FIG. 4 illustrates one embodiment of a representative format of a library manager database 118. The format of the library manager database 118 includes a VOLSER field 402 and a construct tag field 404. The VOLSER field 402 stores the VOLSER 403 of a logical volume and is substantially similar to the VOLSER field 302 described previously. The construct tag field 404 preferably stores at least one volume construct tag 406. Each of these volume constructs tags 406 is associated with the VOLSER 403 of a logical volume and provides information concerning the characteristics and actions associated with a logical volume corresponding to the VOLSER 403.

As illustrated in the depicted embodiment, the volume construct tags 406 may include, without limitation, a storage group construct tag 406a, a management class construct tag 406b, a storage class construct tag 406c, and/or a data class construct tag 406d. The depicted embodiment, for example, associates a logical volume designated by the VOLSER "LOG002" with a storage group construct tag 406a "SG01," a management class construct tag 406b "MC02," a storage class construct tag 406c "SC01," and a data class construct 406d "DC01."

Specifically, the storage group construct tag 406a may indicate a construct definition that designates a pool of stack volumes 116 to which a logical volume belongs. A pool refers to a partitioned group of physical volumes 116 that may be exclusive to a certain client base or user group. The pool designation may originate from a user via the host device 106.

The management class construct tag 406b may indicate a construct definition that determines if a secondary copy of a logical volume is made each time the volume is written and closed. The management class construct information may originate from a user via the host device 106 and may be stored, in one embodiment, in the library manager database 118 as discussed in conjunction with FIG. 4.

The storage class construct tag 406c may indicate a construct definition that provides information regarding the access priority of a logical volume and, specifically, determines if the logical volume should remain in the storage cache 225 or if it should be allowed to be removed from the storage cache 225. The storage class construct definition may originate from a user via the host device 106. Additionally, it may be determined by the access frequency history of the logical volume over a period of time.

The volume construct flag 408 contains information that may be needed during the recovery of the association of a logical volume and storage constructs. This flag is described in FIG. 6.

Figure 5:
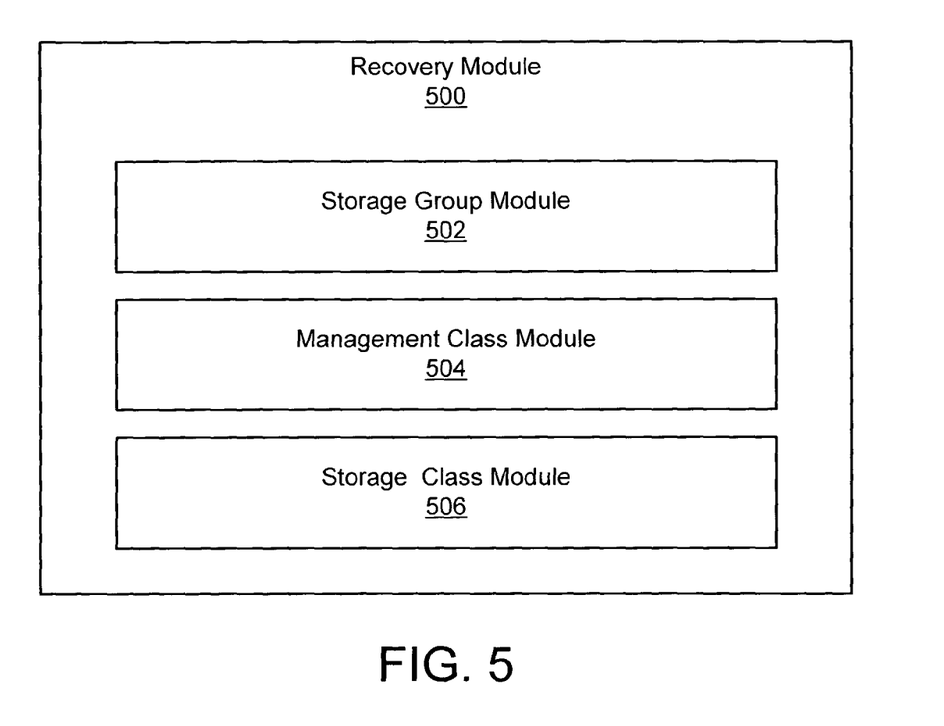
FIG. 5 is a schematic block diagram illustrating one embodiment of a representative recovery module in accordance with the present invention.

FIG. 5 depicts one embodiment of a recovery module 500 configured to recover a construct association with a logical volume. The recovery module 500 is preferably implemented in a VTS system 100 and initiates a recovery process in response to the loss of at least a portion of the information stored in the library manager database 118. The recovery module 500 includes a storage group module 502, a management class module 504, and a storage class module 506. The functionality of the recovery module 500 can shared between the VTS 104 and the library manager 110.

The storage group module 502 is configured to recover an association between a storage group construct definition and a logical volume. The association is preferably recovered during an insert process by a host processor.

The management class module 504 is configured to recover an association between a management class construct definition and a logical volume. The association is preferably recovered by determining if a secondary copy of the logical volume should be made.

The storage class module 506 is configured to recover an association between a storage class construct definition and a logical volume. The association is preferably recovered by determining if a logical volume should remain in the storage cache 225 for future accesses.

Of course, not all of the modules 502, 504 and 506 discussed above need to be present in the recovery module 500. Additionally, other modules not shown herein may be employed to recover an association between a distinct construct definition not described herein and a logical volume.

Figure 6:
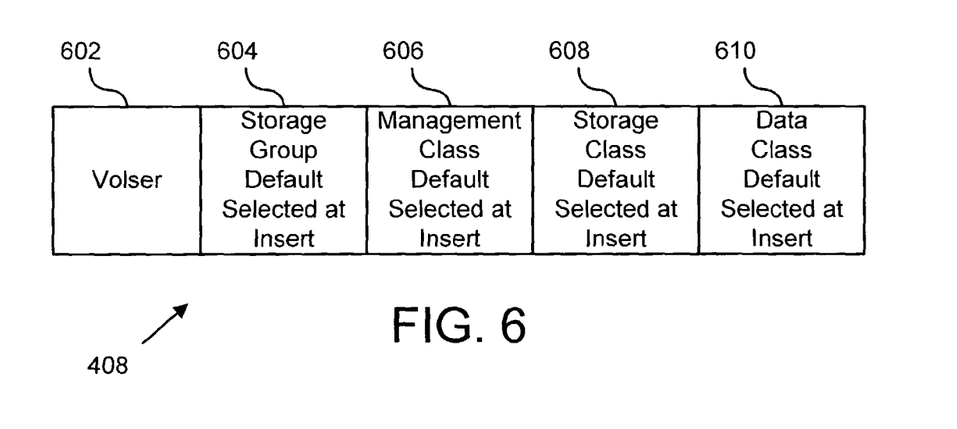
FIG. 6 is a schematic block diagram illustrating one embodiment of a representative volume construct flag format in accordance with the present invention.

FIG. 6 illustrates one embodiment of a representative format of a volume construct flag 408. The volume construct flag 408 includes a VOLSER field 602 that stores a VOLSER associated with a logical volume. The flag 408 also includes a storage group default selected at insert field 604, a management class default selected at insert field 606, a storage class default selected at insert field 608, and a data class default selected at insert field 610. Each of the foregoing fields 604, 606, 608, and 610 are configured to contain values that can be set or cleared to selectively signify the status of the corresponding construct default selection at insert.

Figure 7:
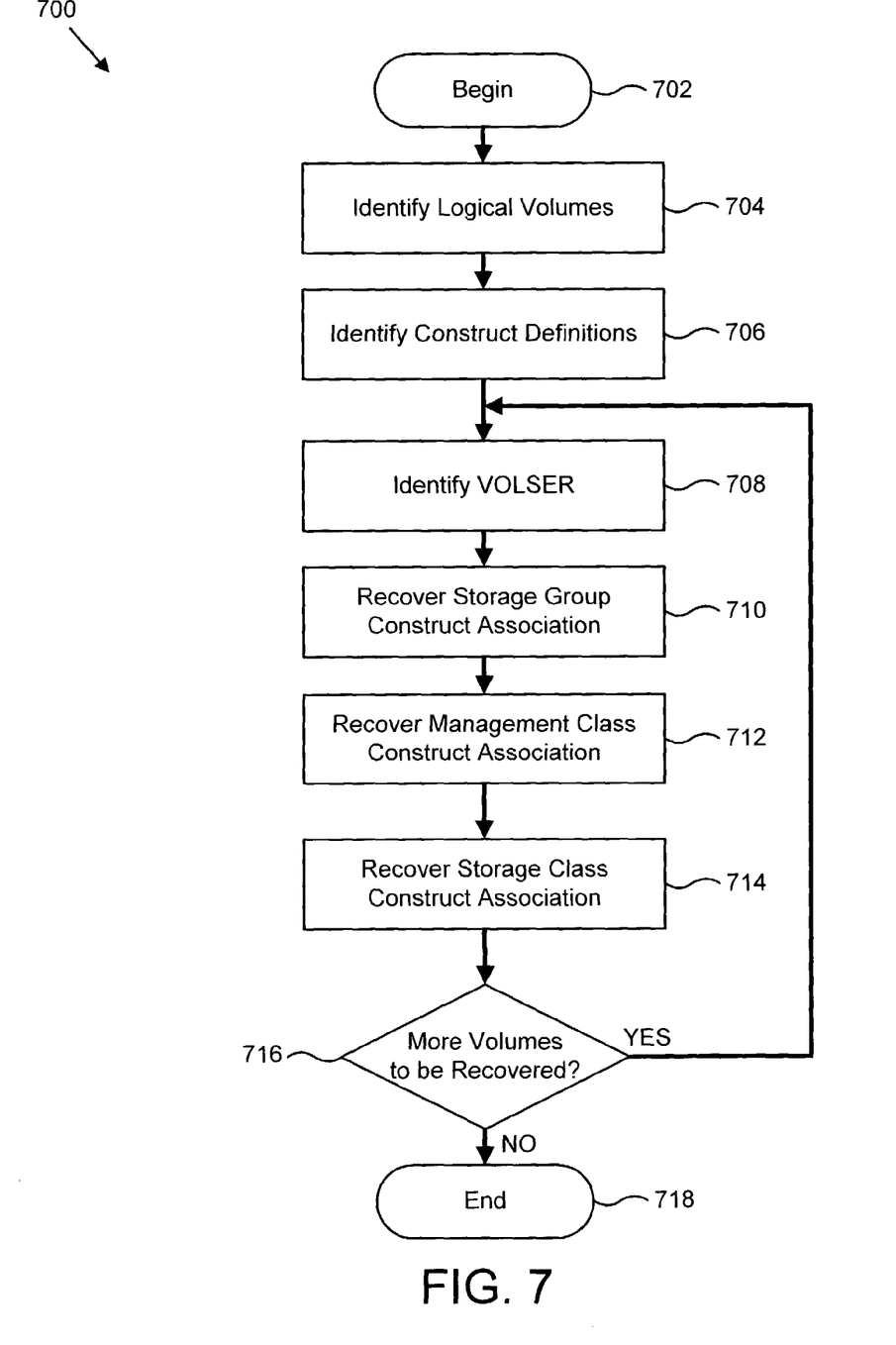
FIG. 7 is a schematic flow chart illustrating the flow of recovering logical volume and construct associations.

FIG. 7 illustrates one embodiment of a construct association recovery method 700 in accordance with the present invention. After a disaster involving a library manager database 118 and the information contained therein, the method 700 begins 702 with the identification 704 of available logical volumes that were originally included in the library manager database 118. The method 700 then identifies 706 a set of construct definitions that may be associated with the identified logical volumes.

The method 700 proceeds with the identification 708 of the VOLSER corresponding to a particular logical volume for which the association with a construct definition has been lost. After the VOLSER has been identified 708, the VTS system 100 implements the necessary steps to recover 710 the storage group construct association. The method 700 continues with the recovery 712 of the management class construct association. Finally, the depicted embodiment includes a step to recover 714 the storage class construct association. After the construct associations with a specific logical volume have been recovered, the method tests 716 if further associations between logical volumes and construct definitions are to be recovered. The method 700 illustrates that the recovery of subsequent associations between construct definitions and logical volumes loops through the steps 708, 710, 712, and 714 described above. Otherwise, if no further associations are to be recovered, the method 700 ends 718.

Figure 8:
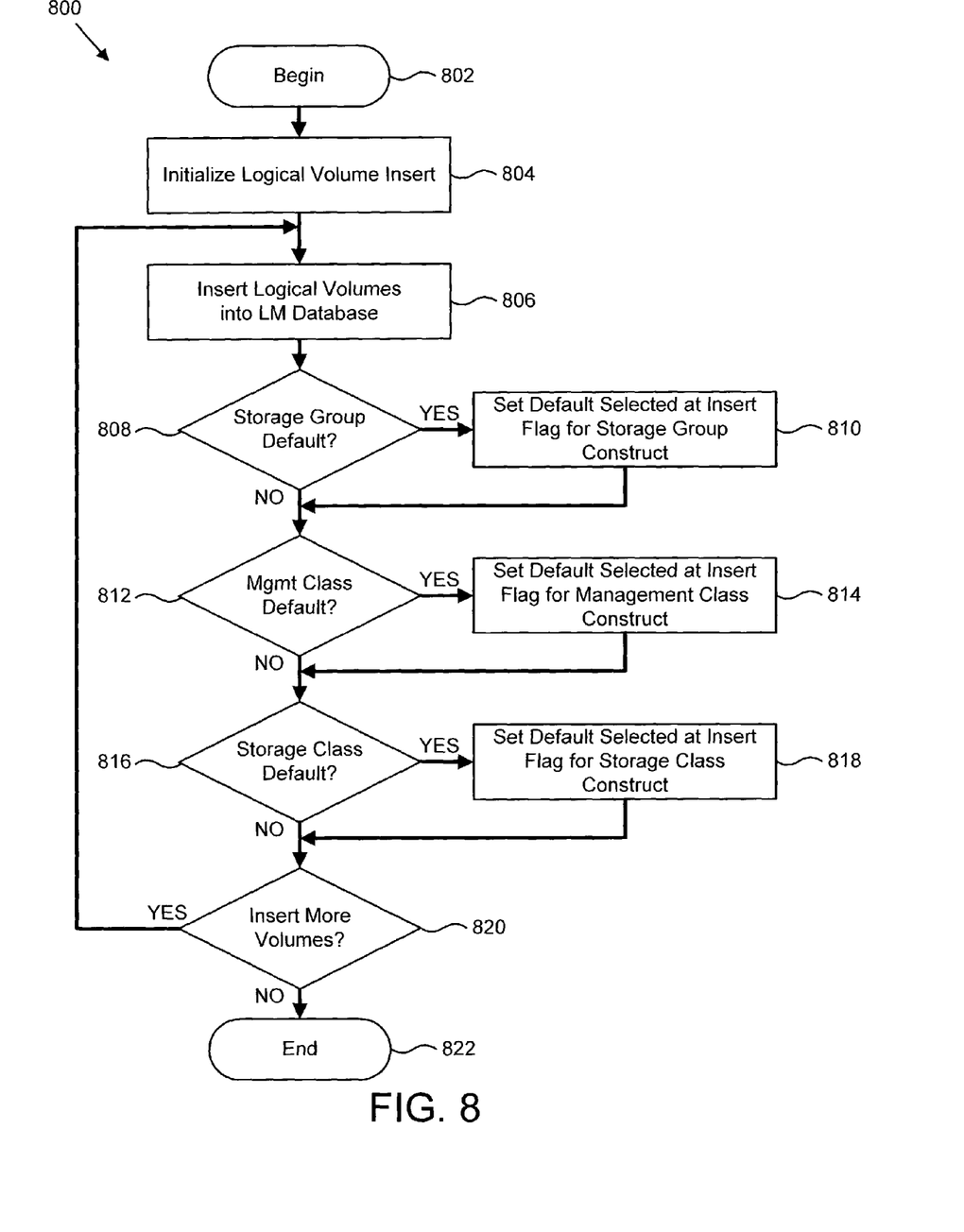
FIG. 8 is a schematic flow chart diagram illustrating one embodiment of a representative set volume construct flag method for use in the recovery of a construct association between a construct definition and a logical volume in a VTS system in accordance with the present invention.

FIG. 8 illustrates one embodiment of a representative method 800 to set a volume construct flag 408 in a VTS system 100. The method 800 may be used in conjunction with certain steps of FIGS. 10, 11, and 12 as will be discussed below. The method 800 begins 802 with the initialization 804 of the logical volume insert process. An operator requests, via the control panel of the library manager 110, that a logical volume be inserted. The operator specifies a VOLSER range and construct tags 406 to be associated with the logical volume. The method 800 continues as the library manager 110 inserts 806 the logical volume into the library manager database 118.

Once the logical volume is inserted 806 into the library manager database 118, the library manager 110 tests 808 whether or not the value stored in the storage group construct field 406a is set to a default value. If the default value is stored, then the library manager 110 sets 810 the storage group default selected at insert flag 604 in the volume construct flag 408.

The method 800 then continues with a test 812 to determine if the value stored in the management class construct field 406b is set to a default value. If the default value is stored, then the library manager 110 sets 814 the management class default selected at insert flag 606 in the volume construct flag 408. This process is similar to the test 808 and set 810 procedure explained above.

The method 800 continues with a test 816 to determine if the value stored in the storage class construct field 406c is set to a default value. If the default value is stored, then the library manager 110 sets 818 the storage class default selected at insert flag 608 in the volume construct flag 408. This process is similar to the test 808 and set 810 procedure explained above.

In an alternative embodiment, an additional step (not shown) may be inserted after each of the tests 808, 812, and 816 if it is determined that the corresponding default construct values are not stored. This step includes clearing the construct default selected at insert flags 604, 606, and 608, individually and independently from one another, to ensure that a previously set flag does not remain set when a default construct value is not used.

After the tests 808, 812, and 816 have been performed for the inserted logical volume, the method 800 tests 820 if more logical volumes 212 are requested to be inserted. If more logical volumes 212 are requested to be inserted, the method loops to the insert 806 step and repeats the testing process presented above. Once the method 800 determines that no additional logical volumes are requested to be inserted, the insert method 800 ends 822.

Figure 9:
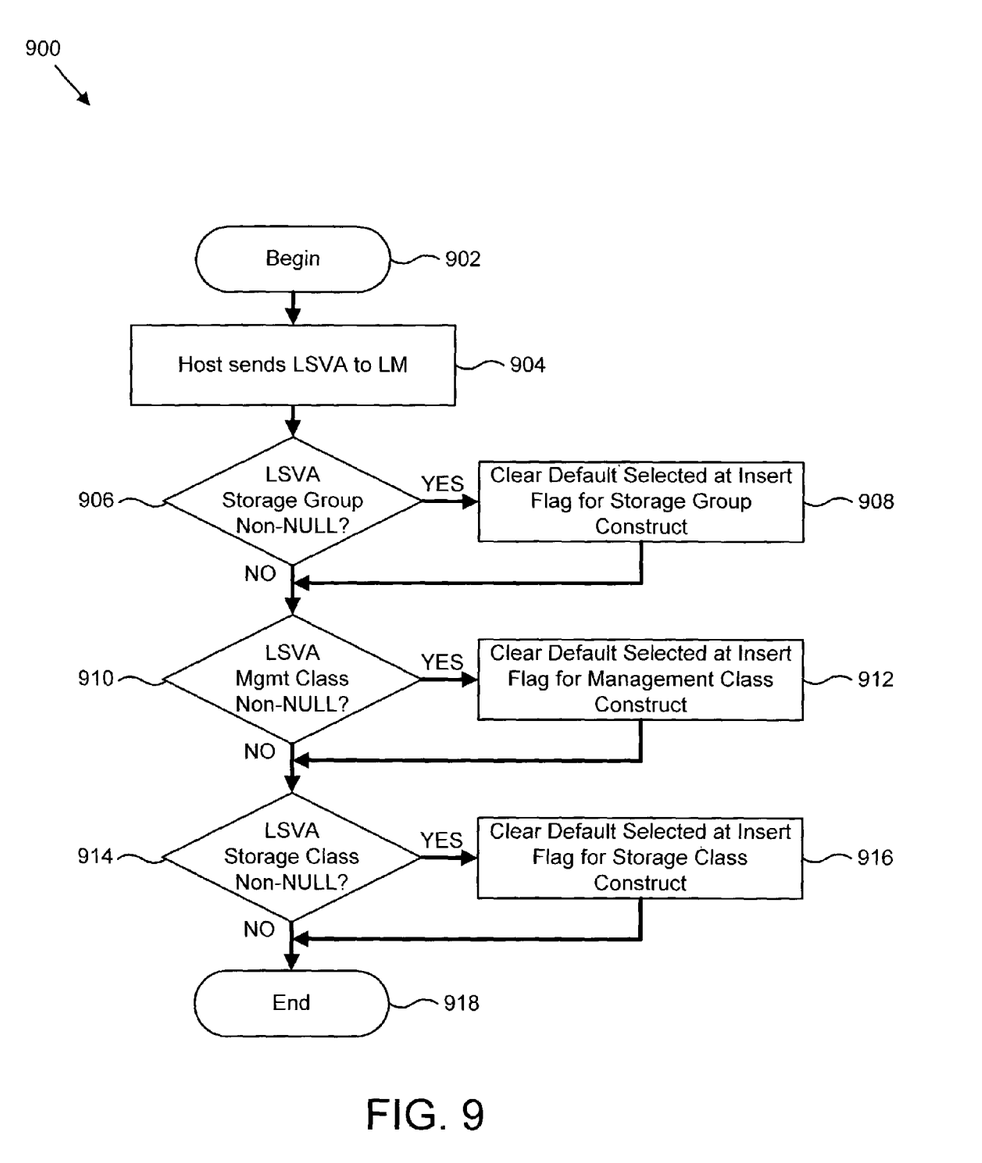
FIG. 9 is a schematic flow chart diagram illustrating one embodiment of a representative clear volume construct flag method for use in the recovery of a construct association between a construct definition and a logical volume in a VTS system in accordance with the present invention.

FIG. 9 illustrates one embodiment of a representative method 900 to clear a volume construct flag 408 in a VTS system 100. The method 900 may be used in conjunction with certain steps of FIGS. 10, 11, and 12 as will be discussed below. The method 900 begins 902 when a host 106 sends 904 a command, such as a "perform library function—library set volume attribute" (LSVA) command, to the library manager 110. An LSVA command may be sent 804 when a volume construct tag 406 is changed. The receipt of an LSVA command institutes a series of tests for clearing each of the volume construct flags 408 as described below.

The library manager 110 tests 906 to determine if the storage group field in the LSVA is non-null, meaning that it contains a new volume construct value. If the storage group value in the LSVA command is non-null, then the library manager 110 clears 908 the storage group default selected at insert flag 604 in the volume construct flag 408. This clear 908 step is substantially similar to the clear step that may alternately be employed after the test 808, as explained previously.

The method 900 continues with a test 910 to determine if the management class field in the LSVA command is non-null. If the test 910 is positive, then the library manager 110 clears 912 the management class default selected at insert flag 606 in the volume construct flag 408. This procedure is similar to the test 906 and clear 908 steps explained above and may alternately be employed after the test 812, as explained previously.

The method 900 continues with a test 914 to determine if the storage class field in the LSVA command is non-null. If the test 914 is positive, then the library manager 110 clears 916 the storage class default selected at insert flag 608 in the volume construct flag 408. This procedure is similar to the test 906 and clear 908 steps explained above and may alternately be employed after the test 816, as explained previously.

Figure 10:
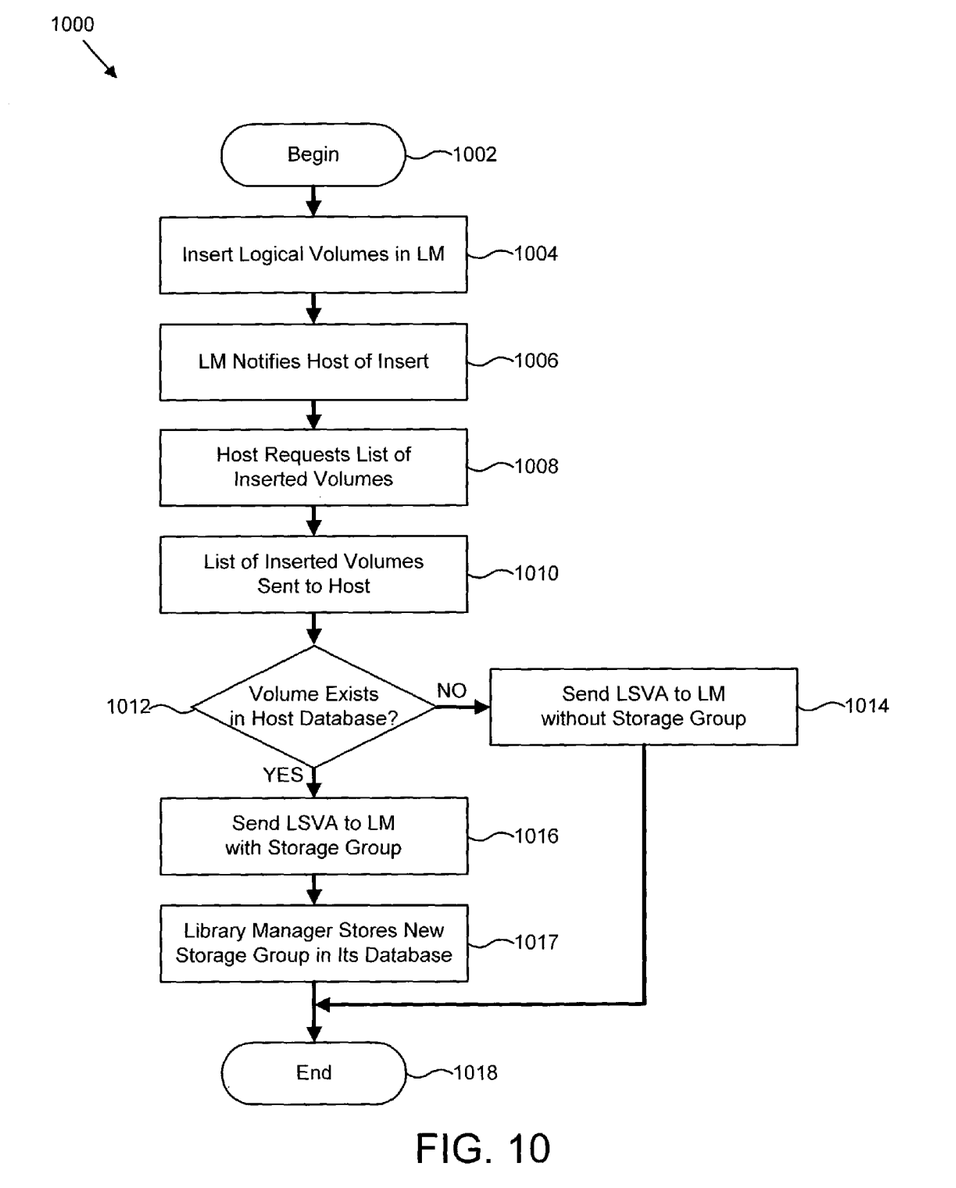
FIG. 10 is a schematic flow chart diagram illustrating one embodiment of a representative storage group construct recovery method in accordance with the present invention.

FIG. 10 depicts one embodiment of a representative storage group construct recovery method 1000 for use in a VTS system 100 and is given by way of example of the storage group construct association step 710 of FIG. 7. The method 1000 begins 1002 as at least one new logical volume is inserted 1004 at the library manager 110. At this point, the volume is set to the insert category. The library manager 110 then notifies 1006 the host 106 that there are new volumes in the insert category. Upon such notification 1006, the host 106 requests 1008 a list of the newly inserted volumes and uploads 1010 the list from the library manager database 118.

The method 1000 continues with a test 1012 to determine if the new volume already exists in a database of the host 106. If the volume does not exist in the host 106 database, the host 106 sends 1014 a LSVA command with a category and without a storage group, to the library manager 110. If the volume does exist in the host 106 database, the host 106 sends 1016 a LSVA command with a category and a storage group to the library manager 110. The steps 1014 and 1016 are similar to the step 904 and may invoke the method 900 to determine if a storage group default selected at insert flag 604 will be cleared or not. If the LSVA command contains a storage group, the library manager 110 updates 1017 its database 118 with the new logical volume and storage group association. The method 1000 ends after the host 106 sends 1014 or 1016 the LSVA command to the library manager 110.

The method 1000 may be implemented in conjunction with or independently from the storage group module 502.

Figure 11:
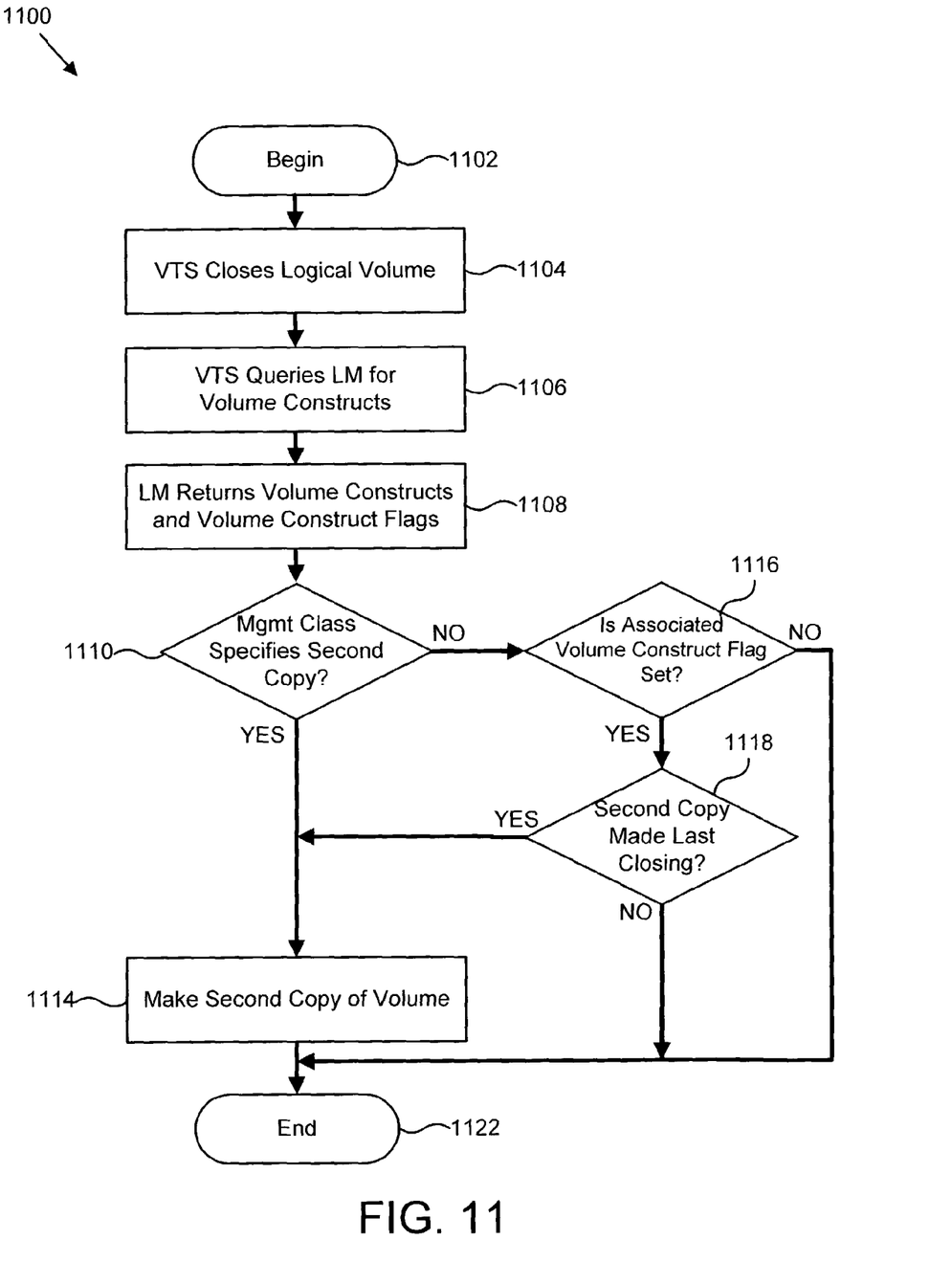
FIG. 11 is a schematic flow chart diagram illustrating one embodiment of a representative management class construct recovery method in accordance with the present invention.

FIG. 11 depicts one embodiment of a representative management class construct recovery method 1100 for use in a VTS system 100 and is given by way of example of a management class construct association recovery step 712 of FIG. 7. The method 1100 begins 1102 after a write to an open volume has occurred and the virtual tape server 104 closes 1104 the logical volume. After closing 1104 the volume, the virtual tape server 104 queries 1106 the library manager 110 for the volume constructs tags 406 and definition sand definitions. Such constructs and definitions may include a volume construct flag 408 associated with the logical volume.

The method 1100 continues as the library manager 110 accesses its database 118 and returns 1108 the volume constructs 406, associated definitions, and flags 408 to the virtual tape server 104. The method 1100 then tests 1110 to determine if the definition or action associated with the management class construct tag 406b specifies that a duplicate copy of the volume be made. If the action does specify that a second copy be made, the virtual tape server 104 makes 1114 a duplicate copy of the volume.

If the action does not specify that a duplicate copy be made, the method 1100 continues with a test 1116 to determine if the management class default selected at insert flag 606 is set. If the management class default selected at insert flag 606 is set, the method 1100 tests 1118 to determine if a duplicate copy of the volume was made the last time the volume was closed. If a copy was made the last time the volume was closed, the method 1100 follows step 1114, previously discussed, and produces a second copy of the volume.

If either of the tests 1116 or 1118 returns a negative response, a second copy of the volume is not made. The method 1100 ends 1122 after a final determination is made regarding whether or not to make a duplicate copy of the volume.

Figure 12:
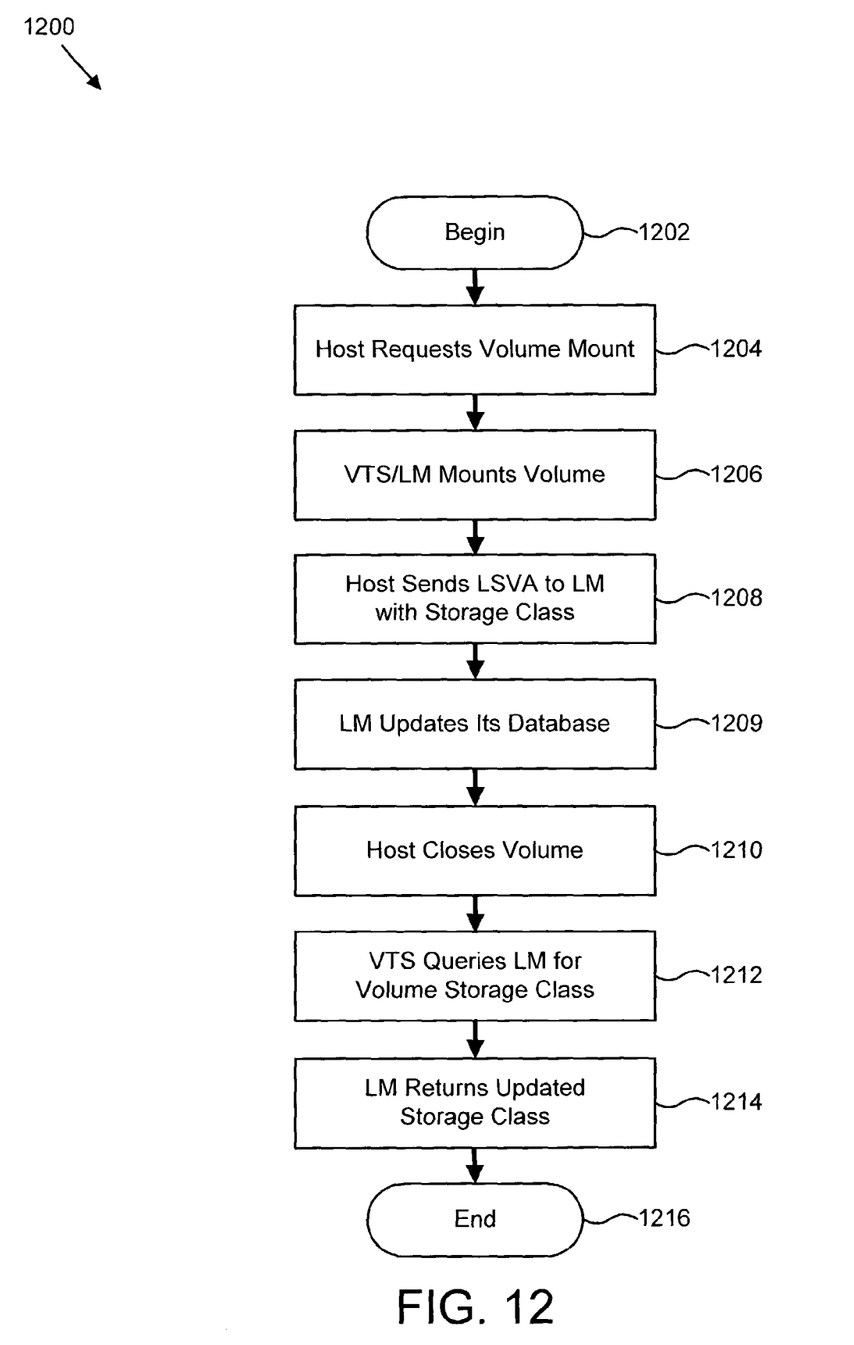
FIG. 12 is a schematic flow chart diagram illustrating one embodiment of a representative storage class construct recovery method in accordance with the present invention.

FIG. 12 depicts one embodiment of a representative storage class construct recovery method 1200 for use in a VTS system 100 and is given by way of example of a storage class construct association recovery step 714 of FIG. 7. The method 1200 begins 1202 when a host 106 requests 1204 a volume to be mounted. Subsequently, a virtual tape server 104 and library manager 110 perform 1206 the mount.

After the volume is mounted, the host 106 sends 1208 an LSVA command specifying the desired storage class to be associated with the mounted volume. In step 1209 the library manager 110 updates its database 118 with the new logical volume and storage class association. The host 106 then closes 1210 the volume and the virtual tape server 104 queries 1212 the library manager 110 for the storage class and actions associated with the volume. The LM 110, in turn, sends 1214 the updated storage class to the virtual tape server 104 and the method 1200 ends 1216.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for recovery of a construct association with a logical volume in a virtual tape server (VTS) system, the method comprising:

identifying a plurality of logical volumes;

recognizing a plurality of constructs originally associated with one or more of the logical volumes, the constructs comprising a storage group construct for determining a pool of stack volumes, a management class construct for determining whether a secondary copy of a logical volume should be made, and a storage class construct for determining whether a logical volume should remain in cache;

implementing a recovery action to recover the association of a construct with a logical volume as determined by a construct type, the recovery action including storing the association of a construct in a database, and wherein implementing the recovery action to recover the construct association comprises recovering a storage group construct association during a logical volume insert process by a host.

2. The method of claim 1, wherein implementing the recovery action to recover the construct association comprises recovering a management class construct association by determining whether a second copy of a logical volume should be made.

3. The method of claim 1, wherein implementing the recovery action to recover the construct association comprises recovering a storage class construct association over time by determining whether a logical volume should remain in a cache.

4. The method of claim 1, further comprising monitoring a volume construct flag indicating employment of a default construct definition.

5. A method for recovery of a construct association with a logical volume in a virtual tape server (VTS) system, the method comprising:

identifying a plurality of logical volumes; recognizing a plurality of constructs originally associated with one or more of the logical volumes;

implementing a recovery action to recover the construct association as determined by a construct type, the recovery action including storing the construct association in a database;

recovering a storage group construct association during a logical volume insert process by a host;

recovering a management class construct association by determining whether a second copy of a logical volume should be made;

recovering a storage class construct association over time by determining whether a logical volume should remain in a cache; and monitoring a volume construct flag indicating employment of a default construct definition.

6. An apparatus for recovery of a construct association with a logical volume in a virtual tape server (VTS) system, the apparatus comprising:

a plurality of logical volumes;

a plurality of constructs originally associated with one or more of the logical volumes, the constructs comprising a storage group construct for determining a pool of stack volumes, a management class construct for determining whether a secondary copy of a logical volume should be made, and a storage class construct for determining whether a logical volume should remain in cache;

a recovery module configured to implement a recovery action to recover the construct association as determined by a construct type and to monitor a volume construct flag indicating employment of a default construct definition, the recovery action including storing the construct association in a database.

7. The apparatus of claim 6, wherein the recovery module comprises a storage group module configured to recover a storage group construct association during a logical volume insert process by a host.

8. The apparatus of claim 6, wherein the recovery module comprises a management class module configured to recover a management class construct association by determining whether a second copy of a logical volume should be made.

9. The apparatus of claim 6, wherein the recovery module comprises a storage class module configured to recover a storage class construct association over time by determining whether a logical volume should remain in a cache.

10. An apparatus for recovery of a construct association with a logical volume in a virtual tape server (VTS) system, the apparatus comprising:

a plurality of logical volumes;

a plurality of constructs originally associated with one or more of the logical volumes;

a recovery module configured to implement a recovery action to recover the construct association as determined by a construct type and to monitor a volume construct flag indicating employment of a default construct definition, the recovery action including storing the construct association in a database;

a storage group module configured to recover a storage group construct association during a logical volume insert process by a host;

management class module configured to recover a management class construct association by determining whether a second copy of a logical volume should be made;

storage class module configured to recover a storage class construct association over time by determining whether a logical volume should remain in a cachet.

11. A system for recovery of a construct association with a logical volume in the system, the system comprising:

a virtual tape server (VTS);

an automated library including a library manager;

a host;

a plurality of logical volumes;

a plurality of constructs originally associated with one or more of the logical volumes, the constructs comprising a storage group construct for determining a pool of stack volumes, a management class construct for determining whether a secondary copy of a logical volume should be made, and a storage class construct for determining whether a logical volume should remain in cache; and a recovery module configured to implement a recovery action to recover the construct association as determined by a construct type, the recovery action including storing the construct association in a database.

12. A virtual tape server (VTS) for recovery of a construct association with a logical volume in the system, the system comprising:

a communications interface with a client;

a communications interface with an automated storage media library, including a library manager;

a cache configured to store a plurality of logical volumes; and a recovery module configured to implement a recovery action to recover the construct association as determined by construct types, the recovery action including storing the construct association in a database, the construct types comprising a storage group construct for determining a pool of stack volumes, a management class construct for determining whether a secondary copy of a logical volume should be made, and a storage class construct for determining whether a logical volume should remain in cache.

13. An automated storage media library for recovery of a construct association with a logical volume stored on a virtual tape server, the library comprising:

a communications interface with a virtual tape server (VTS);

a library manager;

a plurality of storage media cartridges;

a plurality of storage media drives;

a cache configured to store in a database a table of VOLSERs and corresponding construct tags associated with construct types, the construct types comprising a storage group construct for determining a pool of stack volumes, a management class construct for determining whether a secondary copy of a logical volume should be made, and a storage class construct for determining whether a logical volume should remain in cache; and a recovery module configured to implement a recovery action to recover the construct association as determined by the construct type, the recovery action including storing the construct association in a database.

14. An apparatus for recovery of a construct association with a logical volume in a virtual tape server (VTS) system, the apparatus comprising:

means for identifying a plurality of logical volumes;

means for recognizing a plurality of constructs originally associated with one or more of the logical volumes;

means for implementing a recovery action to recover the construct association as determined by a construct type, the recovery action including storing the construct association in a database;

means for recovering a storage group construct association during a logical volume insert process by a host;

means for recovering a management class construct association by determining whether a second copy of a logical volume should be made;

means for recovering a storage class construct association over time by determining whether a logical volume should remain in a cache; and means for monitoring a volume construct flag indicating employment of a default construct definition.

15. A computer method for recovering a construct association with a logical volume in a virtual tape server (VTS) system, the method comprising:

identifying a plurality of logical volumes;

recognizing a plurality of constructs originally associated with one or more of the logical volumes;

implementing a recovery action to recover the construct association as determined by a construct type, the recovery action including storing the construct association in a database;

recovering a storage group construct association during a logical volume insert process by a host;

recovering a management class construct association by determining whether a second copy of a logical volume should be made;

recovering a storage class construct association over time by determining whether a logical volume should remain in a cache; and monitoring a volume construct flag indicating employment of a default construct definition.

* * * * *